3,641,125
3-N-(2-HYDROXY-3-PHENOXYPROPYL)-AMINO-1-PHENYLPROPANON-(1) AND THE SALTS THEREOF
Wolfgang Milkowski, Burgdorf, Werner Stuhmer, Eldagsen, and Klaus-Wolf von Eickstedt, Hannover-Bemerode, Germany, assignors to Kali-Chemie Aktiengesellschaft, Hannover, Germany
No Drawing. Filed Dec. 4, 1969, Ser. No. 882,309
Claims priority, application Germany, Dec. 6, 1968, P 18 13 061.5
Int. Cl. C07c 93/06
U.S. Cl. 260—501.18      4 Claims

ABSTRACT OF THE DISCLOSURE

3 - N - (2 - hydroxy-3-phenoxypropyl)-amino-1-phenyl-propanone-(1) having the following formula

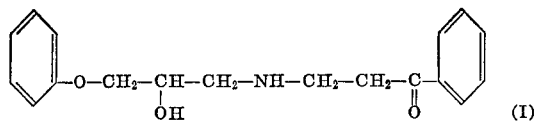

and the salts thereof, the said compounds being characterized by marked central inhibiting activity as well as having an effect on the circulatory and central nervous systems.

---

This invention relates to 3-N-(2-hydroxy-3-phenoxypropyl)amino - 1 - phenyl-propanone-(1) and the salts thereof.

More particularly, this invention relates to 3-N-(2-hydroxy - 3-phenoxypropyl)-amino-1-phenyl-propane-(1) and the salts thereof, the free keto-phenoxy-amino alcohol having the formula

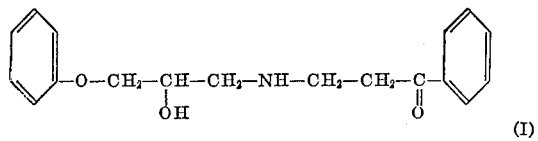

The novel compounds of the invention can be prepared by reacting 2-hydroxy-3-phenoxy-propylamine having the formula

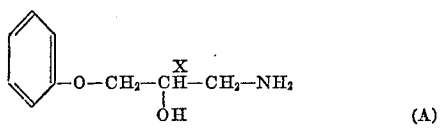

with hydrochloric acid, acetophenone and formaldehyde. Alternatively, the 2-hydroxy-3-phenoxy-propylamine (A) can be reacted with phenyl vinyl ketone prepared by reacting β-chloropropiophenone and potassium acetate. The reaction with compound (A) is preferably carried out at an elevated temperature in the presence of a suitable solvent such as ethanol or isopropanol. The 3-N-(2-hydroxy-3-phenoxypropyl)-amino-1-phenylpropanone-(1), thereby formed is isolated from the reaction mixture as the salt or an acid addition salt, and is purified by treatment with a solvent, such as methanol or acetone, and recrystallisation from ethanol.

This result was not to have been foreseen in that it was to have been expected from the literature describing Mannich—condensation reactions with primary amines that a difficulty separable mixture of many different compounds would be obtained. (Houben vol. XI/1, p. 734 (1957).)

The novel keto phenoxy-amino alcohol and the non-toxic salts thereof in accordance with the invention are characterized by low toxicity, excellent enteral resorption and by their good central inhibiting activity and a simultaneous effect on the circulatory and vegetative nervous systems. The compounds of the invention have been found to constitute excellent blood pressure reducing agents, their blood pressure reducing activity being associated with a central nervous system inhibiting effect.

The $LD_{50}$ in the albino mouse (Type NMRI, male animals weighing 18–20 g., 10 animals per dose) was determined by the method of Litchfild and Witcoxon and amounted to 308 (237–400) mg./kg. live weight when administered orally.

In the unanesthesized dog (2 Beagle per dose) a blood pressure reduction was observed following oral administration of 2.2 mg./kg. live weight of test compound by the method of Riva-Rocci. The blood pressure reduction was significant.

A prolonged blood pressure reduction could be obtained following oral administration of 3.2 mg./kg. weight of test compound to the unanesthesized dog (Beagle).

The above animal tests clearly establish the broad therapeutic range of the compounds of the invention.

The compounds of the invention can be administered orally to patients suffering from high blood pressure with a resultant decrease in blood pressure. In men with high blood pressure was observed a blood pressure reduction to 75/60 mm. Hg after oral administration of 50–200 mg. per die of test compound.

The substance can be therapeutically administered to humans in the form of a pharmaceutical composition comprising the substance as its active ingredient. The composition may include a conventional accompanying substance, such as a pharmaceutically acceptable solid diluent or carrier, e.g. cellulose, starch, polyethylene glycol, magnesium stearate and talcum and may be in the form of a tablet for oral administration.

The following examples are given in order to more clearly illustrate the invention, but are not to be construed as limiting the scope thereof in any way.

EXAMPLE 1

138 g. 2-hydroxy-3-phenoxypropylamine-hydrochloride (A) having a melting point of 129–135° C., 164 g. acetophenone and 40 g. paraformaldehyde in 500 ml. isopropanol were heated under reflux for 4 hours. The precipitate which separated out on cooling was separated off with suction and washed with isopropanol. The precipitate was then heated with methanol, the solid matter separated off by filtering and the recovered filtrate evaporated. The dry residue was heated with acetone. Following cooling, any undissolved material was separated off with suction and recrystallized out of ethanol.

The recovered 3 - N - (2 - hydroxy - 3-phenoxypropyl)-amino-1-phenyl-propanone-(1)-hydrochloride had a melting point of 134–138° C. The yield amounted to 50%. The free base obtained by the neutralization of the hydrochloride with sodium hydroxide had a melting point of 104–105° C. and when reacted with maleic acid resulted in the corresponding maleate having a melting point of 118–119° C.

EXAMPLE 2

6.74 g. β-chloropropionphenone was heated in 25 ml. methanol under reflux with 5 g. anhydrous potassium acetate for 5 minutes. The solution thereby obtained was added dropwise to 6.72 g. 2-hydroxy-3-phenoxypropylamine (A) having a melting point of 89–93° C. dissolved in methanol. After 12 hours, the reaction solution was filtered and the filtrate evaporated. The residue was dissolved in ether. Hydrogen chloride gas was introduced into the ether solution whereby the corresponding hydrochloride salt was precipitated out. The salt was further worked up and purified as described in Example 1. Following recrystallization out of ethanol, the compound had a melting point of 134–138° C. and resulted in no melting point depression with the 3-N-(2-hydroxy-3-phenoxypropyl)-amino-1-phenyl-propanone-(1)-hydrochloride (I) of Example 1.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A compound selected from the group consisting of
   (a) 3-N-(2-hydroxy-3-phenoxypropyl)-amino-1-phenyl-propanone-(1) and
   (b) the non-toxic acid addition salts thereof.
2. A compound according to claim 1 designated 3-N-(2 - hydroxy - 3 - phenoxypropyl)-amino-1-phenyl-propanone-(1)-hydrochloride.
3. A compound according to claim 1 designated 3-N-(2 - hydroxy - 3 - phenoxypropyl)-amino-1-phenyl-propanone-(1)maleinate
4. A compound according to claim 1 designated 3-N-(2 - hydroxy - 3 - phenoxypropyl)amino - 1 - phenyl-propanone-(1).

References Cited

UNITED STATES PATENTS

| | | | |
|---|---|---|---|
| 2,904,591 | 9/1959 | Hanell et al. | 260—570.5 |
| 3,225,095 | 12/1965 | Thiele | 260—570.5 |
| 3,255,096 | 12/1965 | Mills et al. | 260—570.5 |
| 3,358,032 | 12/1967 | Schultz et al. | 260—570.5 X |
| 3,495,015 | 2/1970 | Hofmann et al. | 424—330 |

ROBERT V. HINES, Primary Examiner

U.S. Cl. X.R.

260—570.5 C, 570.7; 424—330